United States Patent [19]

Sligh et al.

[11] 4,286,252
[45] Aug. 25, 1981

[54] ACCELERATION RESPONSIVE MONITOR

[75] Inventors: Alistair D. M. Sligh, Edinburgh; Brian E. Pitches, Lothian, both of Scotland

[73] Assignee: Ferranti Limited, Cheadle, England

[21] Appl. No.: 94,167

[22] Filed: Nov. 14, 1979

[30] Foreign Application Priority Data

Nov. 14, 1978 [GB] United Kingdom ............... 44487/78

[51] Int. Cl.³ ............................................. G01C 23/00
[52] U.S. Cl. .............................. 340/27 SS; 73/178 T; 244/182; 340/27 R
[58] Field of Search ............ 340/27 SS, 27 R, 27 AT, 340/181; 244/182, 194, 76 C; 364/427, 426, 434, 439, 440; 73/178 R, 178 T

[56] References Cited

U.S. PATENT DOCUMENTS

| | | | |
|---|---|---|---|
| 3,077,110 | 2/1963 | Gold | 73/178 T |
| 3,148,540 | 9/1964 | Gold | 73/178 T |
| 3,241,362 | 3/1966 | Scott | 340/27 SS |
| 3,309,923 | 3/1967 | Bishop et al. | 73/178 T |
| 3,950,740 | 4/1976 | Greene | 340/27 R |
| 3,958,218 | 5/1976 | Bateman | 340/27 R |
| 4,115,756 | 9/1978 | Di Cecio | 340/27 R |

*Primary Examiner*—James J. Groody
*Attorney, Agent, or Firm*—Kerkam, Stowell, Kondracki & Clarke

[57] ABSTRACT

Apparatus for monitoring the acceleration of an aircraft moving along the ground includes a linear accelerometer (FA) and a rate gyroscope (RG). The accelerometer FA is fixed to the frame of the aircraft with its sensitive axis substantially horizontal, and circuit means A3, A4, are provided to null any output when the aircraft is at rest. The rate gyroscope RG is arranged to correct for any misalignment of the axis of the accelerometer, and further circuits A1, A2 null the output of the gyroscope while the aircraft is at rest. An amplifier A5 adds the outputs of the accelerometer and gyroscope channels, and correction amplifier A6 and unit AD correct the output of the summing amplifier A5 for aerodynamic drag resistance of the aircraft at any instant. The corrected output is applied to a suitable indicator such as a meter M.

7 Claims, 2 Drawing Figures

ACCELERATION RESPONSIVE MONITOR

This invention relates to accelerationresponsive apparatus, and in particular to such apparatus for monitoring the acceleration of an aircraft moving on the ground.

When an aircraft is taking-off the decision whether to abort or continue the take-off depends upon the speed of the aircraft at a certain point along the runway. If, however, the pilot is given an indication of the rate of increase or decrease in the aircraft's acceleration, he may receive advance warning of faults such as a fall-off in engine performance. This would enable corrective action to be taken earlier. Various attempts have been made to compute the acceleration from a knowledge of the engine thrust, but these have been unsatisfactory. The most effective method is to measure the actual acceleration of the aircraft using an accelerometer. However, in order to avoid errors due to the earth's gravity, it has been necessary to mount the accelerometer on a gyro-stabilised platform. This is necessarily a costly solution, and particularly so as the acceleration monitor is only required for a very short part of a flight.

Since the pilot's attention is fully occupied during take-off it is preferable to provide some audible or visual indication that the situation is either satisfactory or unsatisfactory.

It is an object of the invention to provide acceleration-responsive apparatus which is less costly and satisfies the requirements set out above.

According to the present invention there is provided apparatus for monitoring the acceleration of an aircraft moving on the ground, which includes a linear accelerometer rigidly secured to the aircraft with its sensitive axis along a fore-and-aft line of the aircraft and nominally horizontal, first circuit means operable to null the output of the accelerometer whilst the aircraft is at rest, gyroscope operable to determine the attitude of the sensitive axis of the accelerometer relative to a horizontal plane, second circuit means operable to correct for pitch movements of the aircraft whilst the aircraft whilst the aircraft is moving on the ground, summation means operable to combine the outputs of the first and second circuit means, correction means operable to reduce the output of the summation means by an amount dependent upon the aerodynamic drag resistance of the aircraft at any instant, and indicator means operable to provide an indication of the corrected output of the summation means.

Preferably the indicator means is operable to provide an indication when the corrected output of summation means falls below a preset threshold level.

An embodiment of the invention will now be described with reference to the accompanying drawings, in which.

Figure 1:
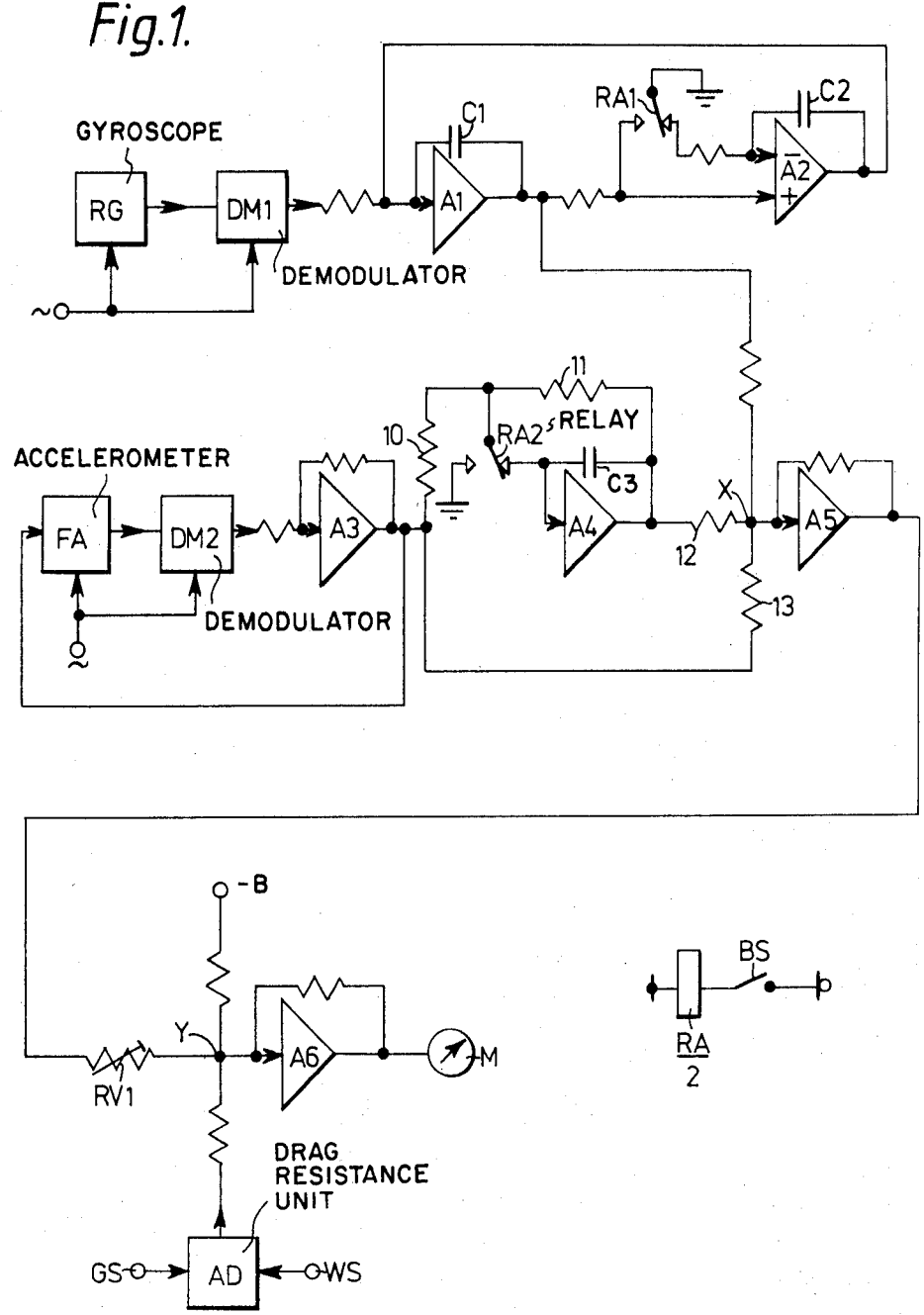
FIG. 1 is a schematic circuit diagram of acceleration-responsive apparatus.

Referring now to FIG. 1, it will be seen that separate accelerometer and gyroscope channels each provide outputs which are combined by a summing amplifier.

The gyroscope channel comprises a single-axis rate gyroscope RG provided with a suitable alternating-current supply arranged to be applied only when the aircraft is on the ground. The gyro output is demodulated in a demodulator DM1 and applied to the input of an amplifier A1 connected as an integrator with a feedback capacitor C1. The output of amplifier A1 is connected to the non-inverting input of an operational amplifier A2. This input to the amplifier A2 is also connected to the normally-open contact of a changeover switch RA1. The moving contact of RA1 is connected to earth potential, and the normally-closed contact to the inverting input of the amplifier A2. Amplifier A2 has a feedback capacitor C3 connected between its output and its inverting input, whilst the output of amplifier A2 is also connected to the input of amplifier A1.

The accelerometer channel comprises a force-feedback accelerometer FA and demodulator DM2 also connected to a suitable alternating current supply. The output of the demodulator DM2 is connected to the input of an amplifier A3 having a resistive feedback network.

The output of amplifier A3 is connected through a resistor 10 of value R and the normally-closed contacts of a changeover switch RA2 to the input of an amplifier A4. This amplifier has a feedback capacitor C3 connected between its output and input, and in addition a resistor 11 of value NR is connected between the output of the amplifier and the junction between the moving contact of switch RA2 and the resistor value R. The other fixed contact of switch RA2 is connected to earth potential. The output of amplifier A4 is connected through a further resistor 12 of value NR to a summing point X. Also connected through a resistor to summing point X is the output of amplifier A1. A further resistor 13, of value R connects the output of amplifier A3 to the summing point X.

Summing point X is connected to the input of summation means in the form of amplifier A5, having a resistive feedback network. The output of amplifier A5 is connected through a potentiometer RV1 to a second summing point Y. Also connected to point Y through separate resistors are a bias voltage −B, and the output of a unit AD arranged to determine the aerodynamic drag resistance of the aircraft. The two inputs to this unit are a signal GS indicating measured ground speed and a further signal WS indicating wind speed, the two signals together determining the airspeed of the aircraft.

The summation point Y is connected through an amplifier A6 to a suitable indicator M.

The two switches RA1 and RA2 are contacts of a relay RA which is energised by a switch BS when the brakes of the aircraft are released at the beginning of the aircraft take-off run.

Since the apparatus is only required to function whilst the aircraft is on the ground during its take-off run, the entire system may be arranged to be disconnected when the aircraft leaves the ground.

The operation of the apparatus described above is as follows:

Consider first the accelerometer channel. Due to the loading of the aircraft, the slope of the runway and other possible factors the accelerometer will probably have its sensitive axis directed away from the horizontal. There will thus be an output from the demodulator DM2 due to the component of gravity sensed by the accelerometer. Additionaly, as the aircraft taxis to the start of its take-off run the output of the accelerometer will respond to the movements of the aircraft.

The output of amplifier A3 is applied to the summing point X via resistor 13 and to the input of amplifier A4 via resistor 10. If the output voltage of amplifier A3 is v, then the output voltage of amplifier A4 will be −Nv, since the gain of the amplifier will be −N. The current through resistor 12 into summing point X will therefore be $-Nv/NR$, or $-v/R$, whilst the current through resistor 13 into summing point X will be $v/R$. Hence there two currents will cancel out, and there will be no output from amplifier A5 due to any accelerometer output.

When the aircraft is at rest, just prior to take-off the switch RA2 changes over and the output voltage of amplifier A4 will remain fixed at $-Nv$. The output of amplifier A3 will change as the aircraft accelerates, to some value V. The input current to the summing point X will therefore be $(V-v)/R$.

Now consider first the gyroscope channel. When the aircraft is at rest, the output of the demodulator DM1 should be zero. However, since the gyro is only used for a short period of time a relatively low-quality instrument may be used, and the relatively high drift rate of this gyro may give rise to an output from the demodulator DM1. This output is integrated by amplifier A1. Over a long period of time this could represent a large error, and amplifier A2 is therefore connected to cancel out this error. With switch RA1 in the position shown, the output of amplifier A1 is applied to the non-inverting input of amplifier A2, and the overall feedback loop causes the output of amplifier A2 to become such that the output of amplifier A1 is zero.

When switch RA2 changes, switch RA1 also changes, and the last available output of amplifier A2 is stored by amplifier A2. Any change in the pitch of the aircraft as it moves along the runway will result in an output both from the gyro and from the accelerometer. The output of amplifier A1, representing the gyro output, is applied to the summing point X through a resistor which has a value such that the current supplied to point X exactly balances the change in the output of the accelerometer channel due to the pitch change. Hence the overall current at summing point X is dependent only upon the acceleration of the aircraft along the runway.

The remaining part of the circuit of FIG. 1 is the correction means of the invention. The output of amplifier A5, representing the actual measured acceleration of the aircraft, is applied to a second summing point Y via a variable resistor RV1. Also applied to the summing point Y, from unit AD, is a signal representing the aerodynamic drag resistance of the aircraft. This drag resistance results in a fall-off of the aircraft acceleration, and may be shown to be proportional to the square of the air-speed of the aircraft. Hence the unit AD applies to the summing point a current $Ks^2$, where K is a constant and s is the air-speed of the aircraft. The third input of the summing point Y is a current derived from a constant bias voltage $-B$. The values of the three resistors connected to the summing point Y are chosen such that the input to the summing amplifier A6 represents the acceleration of the aircraft less the retardation due to aerodynamic drag. The output of amplifier A6 thus represents this difference, which may be applied to a suitable indicator such as the meter M. The indication given is such that any unexpected additional retardation is readily noticeable.

The two inputs to unit AD are necessary because, at the low speeds encountered during a take-off run, the usual pitot tube air-speed measuring system may be rather inaccurate. It is therefore preferable to apply to the unit AD the ground speed, which may for example be measured by integrating the acceleration of the aircraft and the wind speed already measured, say, by the control tower. Other suitable sources of air-speed information may be available.

Figure 2:
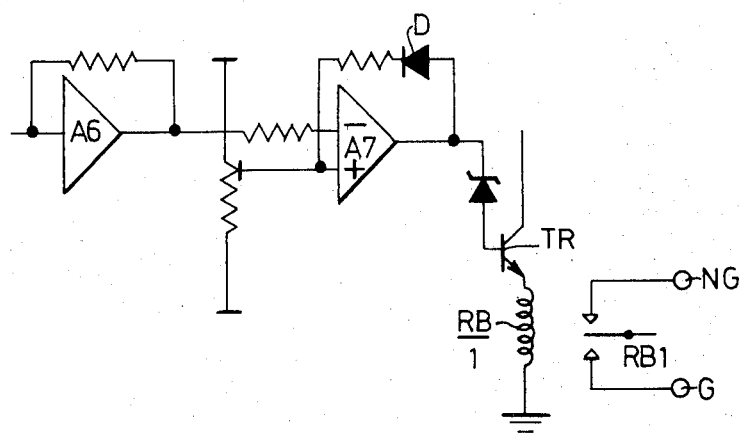
FIG. 2 illustrates one form of indicator means.

FIG. 2 shows an alternative form of indicating means intended to replace the simple meter M with means for presenting the pilot with GO or NO-GO information relating to the acceleration.

Referring now to FIG. 2, the output of amplifier A6 is applied to the inverting input of an operational amplifier A7. The non-inverting input is connected to an adjustable reference voltage. The feedback path between the output of amplifier A7 and its non-inverting input includes a resistor and a diode D, poled as shown. The output of the amplifier is applied, via a zener diode Z, to the base of a transistor TR, the flow of current diode Z, to the base of a transistor TR, the flow of current through which energises the coil of a relay RB having contacts connected to give a GO or a NO-GO indication, either visual, audible or both.

In operation, assume first that the input to summing amplifier A6 rises to such a level that the output of amplifier A6 falls below the reference voltage applied to the non-inverting input of amplifier A7. This causes the output of amplifier A7 to rise to a high value, causing the diode D to conduct. This in turn leads to the flow of feedback current through the diode to the reference input of the amplifier. The voltage on the output of the amplifier is such as to cause the transistor TR to conduct and operate the relay RB, giving a GO signal.

If the value of the input to the summing amplifier falls, then the output of amplifier A6 rises. The state of amplifier A7 will not change until the input to the inverting input of mplifier A7 rises above that of the non-inverting input, that is above the value determined by the reference voltage plus the feedback. When this occurs, however, amplifier A7 will cease conducting, and the relay RB will release giving the NO-GO signal. The feedback on amplifier A7 is now removed, since diode D becomes non-conducting, and the lower threshold of the reference input again applies. The effect of the diode therefore is to provide a degree of hysteresis in the switching level of amplifier A7, and the range of the hysteresis is determined by the feedback resistor. The adjustable reference level enables the lower threshold level to be varied if required.

There are various ways in which the system may be operated. For example, the value of the potentiometer RV1 may be set to conform with the expected initial acceleration of the aircraft, taking into account the engine thrust, aircraft weight, and all other relevant parameters. Any effect producing a decreased acceleration thus becomes immediately apparent.

As an alternative to using a single-axis rate gyroscope, other types of gyroscope may be used, through these tend to be more expensive. For example an integrating gyro may be used, in which case the feedback capacitor C1 of amplifier A1 may be replaced by a resistor.

What we claim is:

1. Apparatus for monitoring the acceleration of an aircraft moving on the ground, which includes a linear accelerometer rigidly secured to the aircraft with its sensitive axis along a fore-and-aft axis of the aircraft and, nominally horizontal, first circuit means operable to null the output of the accelerometer while the aircraft is at rest and including a first amplifier responsive to the output of the accelerometer to develop a first current and a second amplifier operable when the aircraft is at rest to develop a second current equal and opposite to the first current, a gyroscope operable to determine the attitude of the sensitive axis of the accelerometer relative to a horizontal plane, second circuit means responsive to the output of the gyroscope and operable to correct said output for pitch movements of the aircraft while the aircraft is moving on the ground, summation means operable to combine the first and second currents and the output of the second circuit means, correction means operable to reduce the output of the summation means by an amount dependent upon the aerodynamic drag resistance of the aircraft at any instant, and indication means operable to provide an indication of the corrected output of the summation means.

2. Apparatus as claimed in claim 1 which includes means responsive to the commencement of movement of the aircraft to maintain the current applied to the summation means by the second amplifier at the value existing immediately prior to the movement.

3. Apparatus as claimed in claim 1 in which the second circuit means includes a third amplifier operable to integrate the output of the gyroscope and a further amplifier responsive, when the aircraft is at rest, to the output of the said third amplifier to apply feedback thereto to reduce the output of said third amplifier to zero.

4. Apparatus as claimed in claim 3 which includes means responsive to the commencement of movement of the aircraft to maintain the feedback applied to said third amplifier at the value existing immediately prior to the movement.

5. Apparatus as claimed in claim 1 in which the correction means includes means for subtracting from the output of the summation means a current proportional to the square of the airspeed of the aircraft.

6. Apparatus as claimed in claim 5 in which the airspeed of the aircraft is determined from the integrated value of aircraft acceleration and predetermined known airspeed.

7. Apparatus as claimed in claim 1 in which the indication means is operable to provide an indication when the corrected output of the summation means falls below a preset threshold level.

* * * * *